United States Patent
Qiu et al.

(10) Patent No.: US 9,812,956 B2
(45) Date of Patent: Nov. 7, 2017

(54) ARTIFICIAL RIPPLE MODULATION CONTROL CIRCUITRY

(71) Applicant: Fairchild Semiconductor Corporation, San Jose, CA (US)

(72) Inventors: Weihong Qiu, San Ramon, CA (US); Shangyang Xiao, Daly City, CA (US)

(73) Assignee: Fairchild Semiconductor Corporation, San Jose, CA (US)

( * ) Notice: Subject to any disclaimer, the term of this patent is extended or adjusted under 35 U.S.C. 154(b) by 0 days.

(21) Appl. No.: 15/079,924

(22) Filed: Mar. 24, 2016

(65) Prior Publication Data

US 2016/0285368 A1    Sep. 29, 2016

Related U.S. Application Data

(60) Provisional application No. 62/137,478, filed on Mar. 24, 2015.

(51) Int. Cl.
  *H02M 3/156*    (2006.01)
(52) U.S. Cl.
  CPC .................. *H02M 3/156* (2013.01)

(58) Field of Classification Search
  CPC . H02M 2001/0003; H02M 2001/0025; H02M 2001/0029; H02M 3/156; H02M 3/157; H02M 3/158
  See application file for complete search history.

(56) References Cited

U.S. PATENT DOCUMENTS

| | | | | |
|---|---|---|---|---|
| 7,378,822 B2* | 5/2008 | Liao | ..................... | H02M 3/156 323/222 |
| 7,436,158 B2* | 10/2008 | Huang | .................. | H02M 3/158 323/224 |
| 7,457,140 B2* | 11/2008 | Klein | .................... | H02M 3/158 323/225 |
| 2014/0292299 A1* | 10/2014 | Yang | ................... | H02M 3/1588 323/288 |

* cited by examiner

*Primary Examiner* — Gary L Laxton
(74) *Attorney, Agent, or Firm* — Okamoto & Benedicto LLP

(57) ABSTRACT

A power supply system has a power switch circuit that switches an input voltage to generate a switched input voltage, an output circuit that generates an output voltage from the switched input voltage, and a pulse width modulation (PWM) controller that generates a PWM signal to control the power switch circuit. The PWM controller turns OFF the PWM signal based on a ramp signal that emulates a current of an output inductor and a feedback signal that indicates an error between the output voltage and a reference voltage.

19 Claims, 4 Drawing Sheets

ARTIFICIAL RIPPLE MODULATION CONTROL CIRCUITRY

This application claims the benefit of U.S. Provisional Application Ser. No. 62/137,478 filed Mar. 24, 2015, which is hereby incorporated by reference in its entirety.

TECHNICAL FIELD

The present disclosure relates to artificial ripple modulation control circuitry.

BACKGROUND

Peak current mode control is widely used to control an OFF time of a power switch of a DC/DC converter power supply. Conventional approaches to peak current mode control utilize power switch or output inductor current feedback and slope compensation circuitry to provide control signals for a PWM controller. The PWM controller compares these sensed current signals to an output of an error amplifier to determine the turn-off time of a power switch. Thus, the power switch is turned off when the switch or inductor current reaches its peak value. These solutions rely on signals from the output stage of the power supply (e.g., measured switch or inductor current/voltage, etc.) and are therefore subject to significant noise, which may significantly impact the ability to accurately control a power switch, without complex circuitry.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

Figure 1:
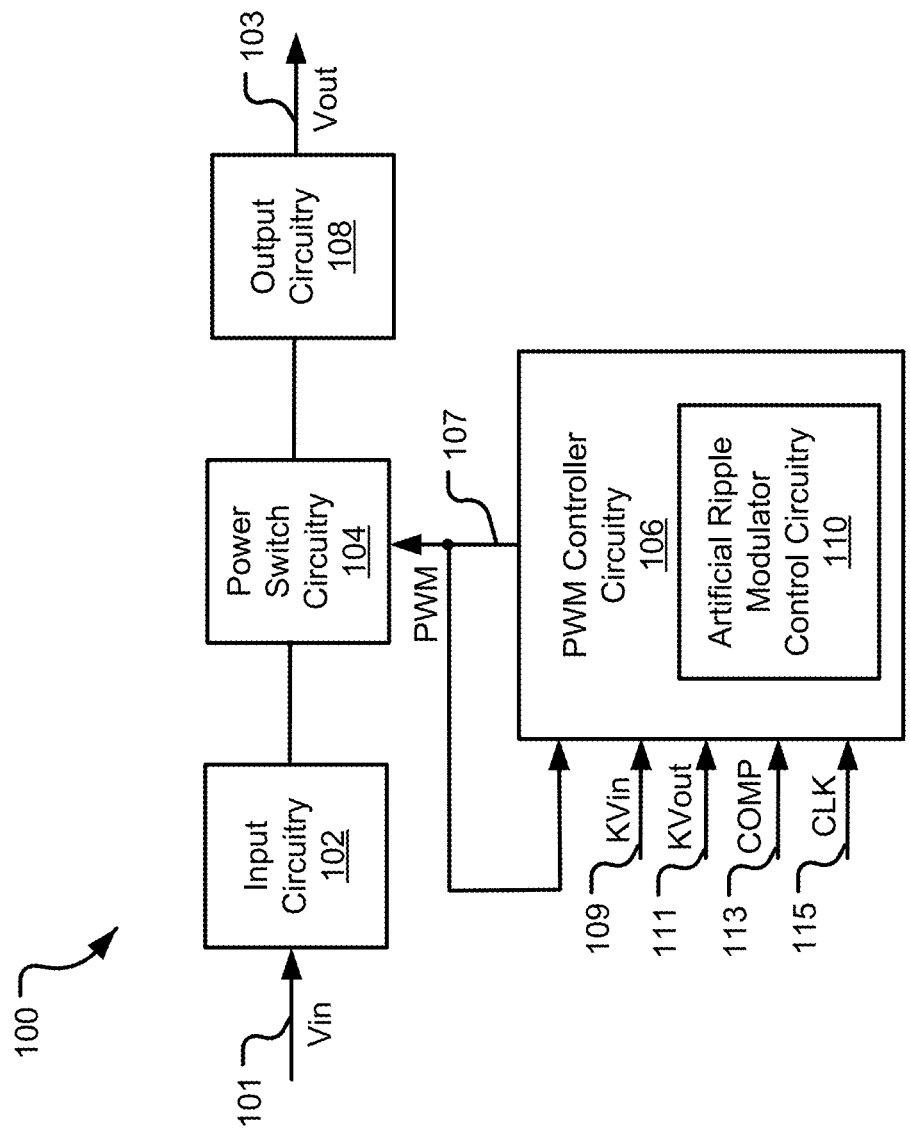
FIG. 1 illustrates an example power supply system consistent with various embodiments of the present disclosure.

FIG. 1 illustrates an example power supply system 100 consistent with various embodiments of the present disclosure. The power supply system 100 of FIG. 1 represents a DC/DC converter system, for example, Buck converter, Boost converter, SEPIC converter, etc., that is configured to receive an input voltage (Vin) and generate and output voltage (Vout) based on, at least in part, the power demand of a load coupled to the output voltage Vout. The circuitry described herein with reference to the system 100 may reside, in whole or in part, within a single device such as, for example, an integrated circuit (IC), or alternatively, some or all of the modules/other system elements in system 100 may be discrete components, combinations of ICs and discrete components, etc. The system 100 may be implemented in a mobile communication and/or computing device wherein a battery voltage (e.g., Vin) may be stepped down (i.e., Buck converter) to a lower voltage (e.g., Vout) needed to drive components such as a processor and/or other integrated circuits (ICs) within the mobile communication and/or computing device.

In general, the power supply system 100 includes input circuitry 102 configured to receive the input voltage 101 (Vin), power switch circuitry 104 configured to controllably switch Vin, pulse width modulation (PWM) controller circuitry 106 configured generate a PWM signal 105 to control a switch state of at least one switch of the switch circuitry 104, and output circuitry 108 configured to generate an output voltage 103 (Vout), based on Vin as switched by the power switch circuitry 104. The power switch circuitry 104 may include, for example one or more power switch devices (e.g., MOSFET switch, BJT switch, etc.). In one example embodiment of a Buck converter system the power switch circuitry 104 may include two power switches, commonly known as a high side switch and a low side switch. Of course, in other embodiments a single power switch topology and/or multiple power switch topology may be used. Output circuitry 108 may include inductor circuitry (not shown) and resonant tank circuitry (not shown) configured to receive switched Vin and generate a controlled inductor current and Vout, as is well known. Load circuitry (not shown) may be coupled to the output voltage (Vout).

PWM controller circuitry 106 is configured to generate at least one PWM control signal 107 that is used to control the conduction state (ON, OFF) of at least one power switch device of the power switch circuitry 104. The PWM control signal 107 has a duty cycle that is generally based on a current (power) requirement of a load coupled to Vout. Duty cycle is usually represented as a percentage of an ON time of the PWM signal 107, and may generally range from 0% (fully OFF) to 100% (fully ON). The duty cycle may increase as current demand increases, and decrease as current demand decreases. In conventional peak current mode control techniques, the duty cycle of the PWM signal is controlled, at least in part, by sensing current in the inductor of the output circuitry. In contrast to conventional approaches, the PWM controller circuitry 106 of the present disclosure includes artificial ripple modulator control circuitry 110 generally configured to control an ON and an OFF timing of the PWM control signal 107. The artificial ripple modulator control circuitry 110 is configured to control the ON and OFF timing of the PWM control signal 107 based on, at least in part, a voltage proportional to Vin (KVin) 109, a voltage proportional to Vout (KVout) 111, an error amplifier compensator output signal (COMP) 113, and a clock signal (CLK) 115. The COMP signal 113 is generally a feedback signal indicative of, or proportional to, an error between Vout and a reference signal (not shown in this Figure). The reference signal is the target value for the output voltage Vout 103. The ON timing of the PWM signal 107 is generally controlled by a rising edge of CLK 115. As will be described in greater detail below, the OFF timing of the PWM signal 107 is generally controlled by comparing an emulated ripple signal, which is generated based on KVin 109 and KVout 111, to COMP 113, and turning OFF the PWM control signal 107 when the emulated ripple signal is approximately equal to COMP 113. K is a constant value representing a gain of the sensed voltage of Vin and Vout.

The value of K may be based on, for example, a required and/or specified ripple voltage for the power supply 100. Advantageously, signals 109, 111, 113 and 115 may be generated without requiring additional and/or complex circuitry, and may be readily available in many integrated circuit applications (e.g., "internal" signals that are typically available in PWM controller ICs). In addition, signals 109, 111, 113 and 115 may be generated relatively free of noise influences, and thus, the accuracy of the PWM controller circuitry 106 may be greatly enhanced over conventional approaches.

Figure 2:
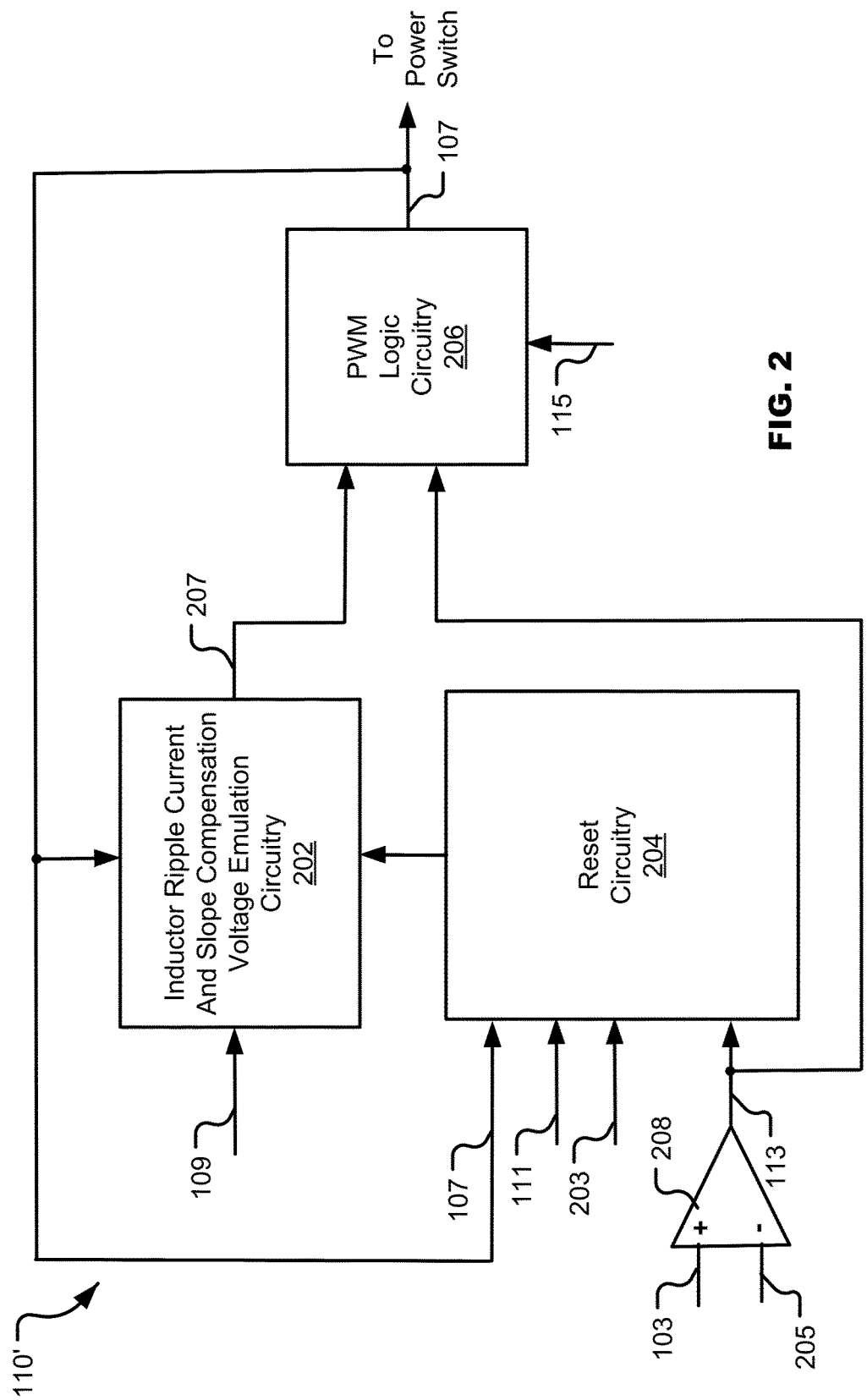
FIG. 2 illustrates example peak current mode control circuitry according to one embodiment of the present disclosure.

FIG. 2 illustrates example artificial ripple modulator control circuitry 110' according to one embodiment of the present disclosure. The circuitry 110' includes inductor ripple current and slope compensation voltage emulation circuitry 202 configured to generate a signal 207 that emulates inductor ripple current and slope compensation voltage. Circuitry 110' also includes reset circuitry 204 configured to reset circuitry 202 between cycles of the PWM signal 107. Circuitry 110' also includes PWM logic circuitry 206 configured to generate the PWM signal 107, and error amplifier circuitry 208 configured to generate the COMP signal 113. Circuitry 202 is configured to receive KVin 109 and the PWM signal 107 to generate signal 207 (signal 207 is hereafter referred to as Var 207). Var 207 is generally a ramp signal that ramps up from a nominal, or baseline value, starting at the leading edge of the ON period of the PWM signal 107. The ramp up time (e.g., slope) of Var 207 is based on the value of KVin 109. When the PWM signal 107 turns OFF, the reset circuitry 204 is configured to reset Var 207 to a baseline value. The baseline value of Var 207 generally depends on the KVout and COMP. Error amplifier circuitry 208 is configured to generate the COMP signal 113 based on Vout 103 and a reference signal 205. The reference signal 205 represents a target value for Vout. The COMP signal 113 is generally a signal indicative of, or proportional to, the difference between the reference signal 205 and Vout 103. The PWM logic circuitry 206 is configured to compare Var 207 with the COMP signal 113. When Var 207 is approximately equal to COMP 113, the PWM signal 107 is terminated (turned OFF). CLK signal 115 initiates the ON timing of the PWM signal 107. The frequency of the CLK signal 115 may be a user-defined setting, preprogramed setting, etc. Reset circuitry 204 is configured to reset Var 245 based on COMP 113, KVout 111, the PWM signal 107 and a reset signal 203. Reset signal 203 has a value proportional to COMP 113. The value of the reset signal 203 represents the baseline value for Var 207 as the PWM signal 107 is turned OFF.

Figure 3A:
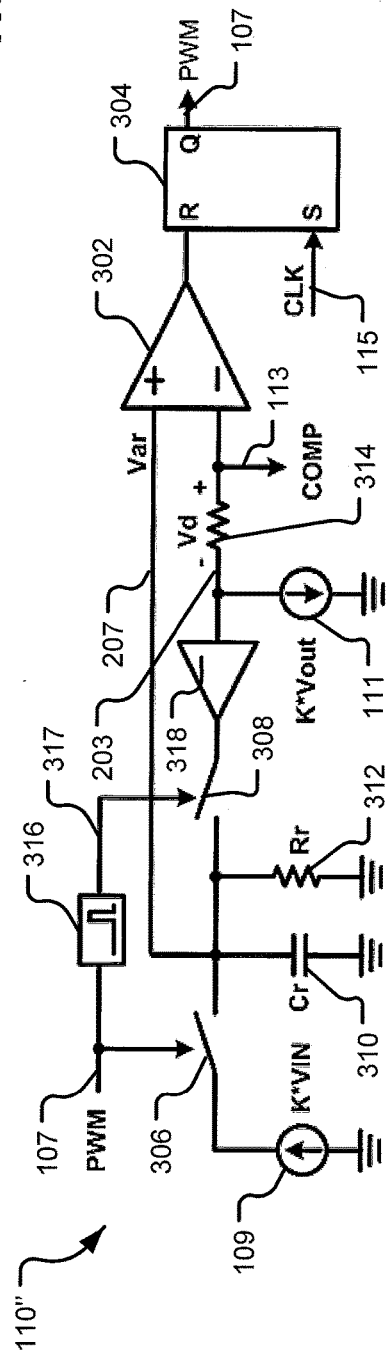
FIG. 3A illustrates example peak current mode control circuitry according to another embodiment of the present disclosure.

FIG. 3A illustrates example artificial ripple modulator control circuitry 110" according to another embodiment of the present disclosure. The artificial ripple modulator control circuitry 110" includes comparator circuitry 302 configured to control a reset operation of flip/flop circuitry 304. The comparator circuitry is configured to compare the Var 207 with the COMP signal 113. As with the previous embodiment, the Var 207 generally emulates inductor current and slope compensation ramp voltage of conventional peak current mode control approaches. Circuitry 110" also includes a first switch 306 having a conduction state that is controlled by the PWM signal 107. Circuitry 110" also includes KVin 109 (represented as a current source in this embodiment) and ramp capacitor 310 configured to generate Var 207 via first switch 306. Circuitry 110" also includes a second switch 308 coupled between COMP 113 and ramp capacitor 310, and one-shot pulse circuitry 316 configured to control a conduction state of the second switch 308. One-shot pulse circuitry 316 is coupled to the PWM control signal 107 and configured to generate a short duration pulse signal 317 on the falling edge of the PWM control signal 107. The duration of the pulse signal 317 is long enough to reset the voltage of the ramp capacitor Cr 310 to the output voltage of the buffer 318. Circuitry 110" also includes KVout 111 (represented as a current source in this embodiment) and a reset resistor 314 coupled to the reset capacitor 310 via the second switch 308. The current through the resistor 314 is KVout 111. This current develops a voltage drop Vd across resistor 314, given by: Vd=KVout*R314. Accordingly, the input voltage to the buffer 318 is given by: COMP−Vd=COMP−Kvout*R314. The output voltage of buffer 318 is equal to the input voltage of buffer 318, and the load current from Cr 310 will not impact the input voltage of buffer 318. Therefore, buffer 318 operates as an amplifier with approximately unity gain (e.g., gain=1). Resistor 312 is used to keep the voltage of Var 207 from running away due to mismatching error of a sensing circuit (not shown) for determining V out.

In operation, a leading edge of the CLK signal 115 sets the flip-flop circuitry 304 to turn PWM signal 107 ON. Switch 306 is closed and current source KVin 109 charges ramp capacitor 310 to generate the Var 207. The Var 207 is the positive input to comparator 302. COMP signal 113 is the negative input to comparator 302. Var 207 is a ramp signal that rises until Var 207 approximately equals COMP 113, and comparator 302 changes state (e.g., from HIGH to LOW). When comparator 302 changes state, flip-flop circuitry 204 is reset, causing the PWM signal 107 to turn OFF, which causes switch 306 to open thus decoupling KVin 109 from the comparator 302. When the PWM signal 107 turns OFF, one-shot pulse circuitry 316 turns ON to close switch 308. When switch 308 is closed, the COMP signal 113 minus the voltage drop across Vd 314 (signal 203) resets the ramp capacitor 310 to a voltage value of (COMP−Vd). KVin 109 is a DC value, and KVin 109 is a current source which means its current is proportional to KVin. The voltage of KVin 109 depends on the value of Cr 310. Therefore, Var 207 ramps between the voltage drop across Vd and the COMP signal 113. A leading edge of the clock signal 115 turns ON the PWM signal 207 in subsequent cycles.

Figure 3B:
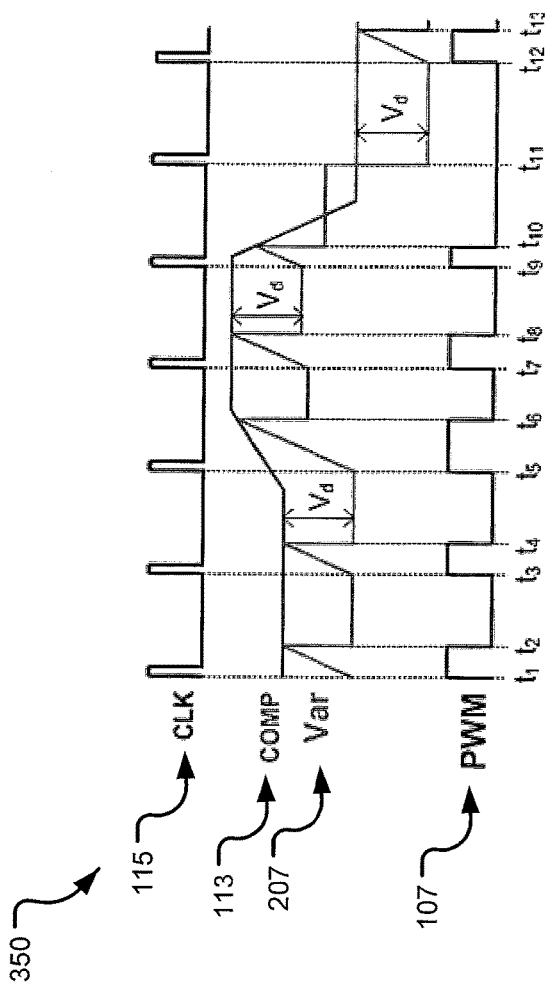
FIG. 3B is an example timing diagram of selected signals of the peak current mode control circuitry of FIG. 3A.

FIG. 3B is an example timing diagram 350 of selected signals of the artificial ripple modulator control circuitry 110" of FIG. 3A. Reference will be made to the timing periods (t1, t2, t3, etc.) depicted at the bottom of the timing diagram 350. With continued to FIG. 3A, in operation, the rising edge of the CLK signal 115 sets flip/flop circuitry 304 so that the PWM control signal 107, at the output of flip/flop circuitry 304, is turned ON (HIGH). This is depicted in the timing diagram at t1, t3, t5, etc. The Var 207 begins to ramp up from Vd until Var 207 equals COMP 113. This terminates the PWM signal 107 at t2, t4, t6, etc. At t5, the COMP signal 113 rises, indicating that load current is increasing and Vout is decreasing. The duty cycle of the PWM signal 107 increases at t5 and t6 to meet the increased current demand. At t7, the COMP signal 113 is at steady state and the duty cycle of the PWM signal 113 is approximately the duty cycle at t1, t2 and t3, t4. PWM control signal 105 closes the first switch 206, thus coupling KVin 109 to ramp capacitor 210 to charge the ramp capacitor 210. At or near t9, the COMP signal 113 is decreasing, indicating that load current demand is decreasing and Vout is increasing. The duty cycle of the PWM signal 107 decreases at t9 and t10 to reflect decreasing current demand. At t11, since the Var 207 is greater than the COMP signal 113, no PWM signal is generated for this cycle. At t11, the output voltage is too high, and the current from the power supply is more than the load current. Var 207 is reset to COMP-Vd at t11 to set the system ready for the next cycle. At t12, the PWM signal 107 operates as normal, and the operation repeats.

Figure 4:
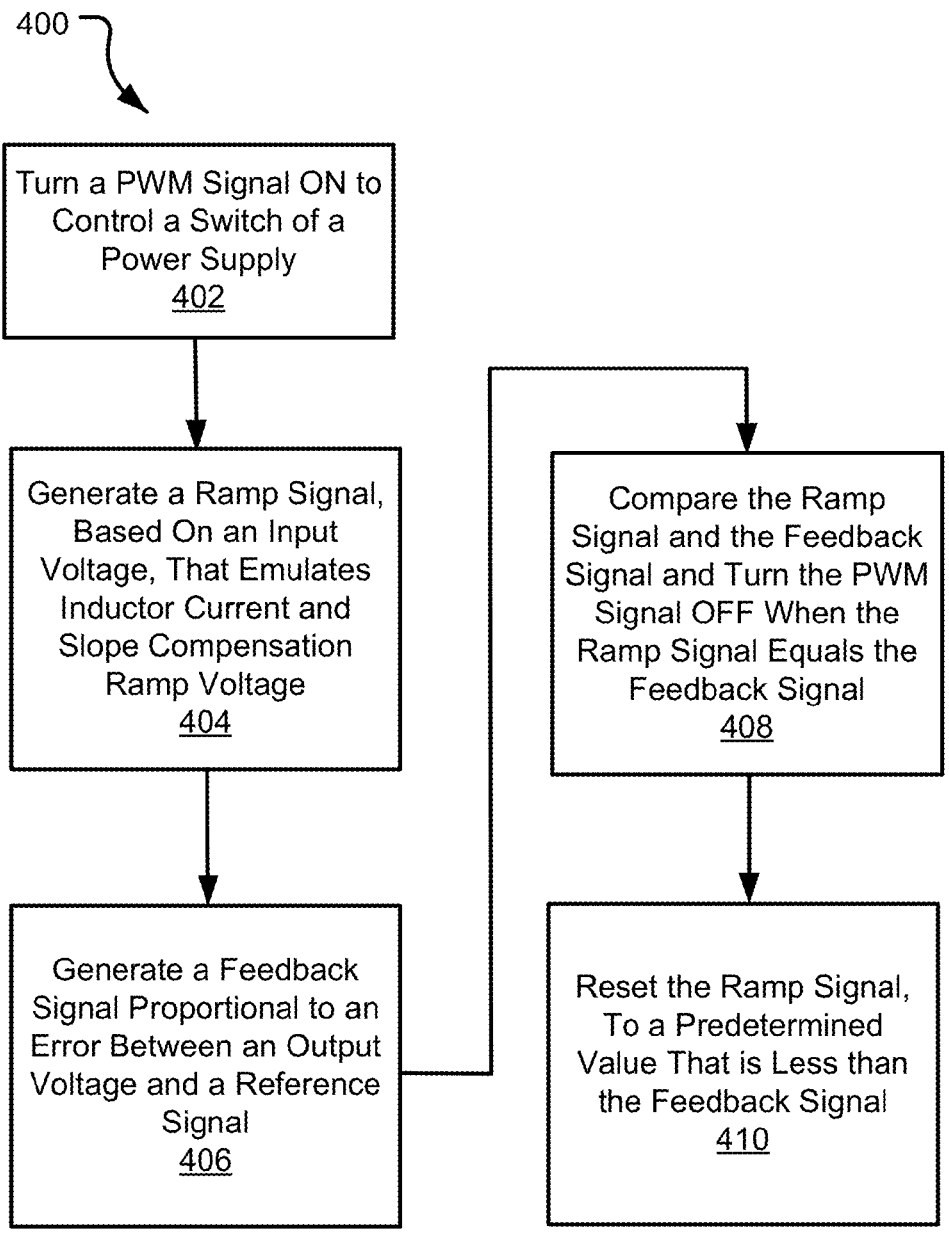
FIG. 4 illustrates example operations for peak current mode control of a power supply in accordance with at least one embodiment of the present disclosure.

FIG. 4 illustrates example operations 400 for peak current mode control of a power supply in accordance with at least one embodiment of the present disclosure. Operations of this embodiment include turning a PWM signal ON to control a switch of a power supply 402. Operations also include generating a ramp signal, based on an input voltage to the power supply, that emulates inductor current and slope compensation ramp voltage 404. Operations also include generating a feedback signal proportional to an error between an output voltage of the power supply and a reference signal 406. Operations also include comparing the ramp signal and the feedback signal and turning the PWM signal OFF when the ramp signal equals the feedback signal 408. Operations may also include resetting the ramp signal to a predetermined value that is less than the feedback signal 410.

While FIG. 4 illustrates various operations according to an embodiment, it is to be understood that not all of the operations depicted in FIG. 4 are necessary for other embodiments. Indeed, it is fully contemplated herein that in other embodiments of the present disclosure, the operations depicted in FIG. 4, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

"Circuitry", as used in any embodiment herein, may comprise, for example, singly or in any combination, hard-wired circuitry, programmable circuitry such as computer processors comprising one or more individual instruction processing cores, state machine circuitry, and/or firmware that stores instructions executed by programmable circuitry. The circuitry may, collectively or individually, be embodied as modules that form part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eM-MCs), secure digital input/output (SDIO) cards, magnetic or optical cards, or any type of media suitable for storing electronic instructions. Other embodiments may be implemented as software modules executed by a programmable control device.

Thus, the present disclosure provides a power supply system that includes power switch circuitry configured to switch an input voltage to generate a switched input voltage; output circuitry including an inductor to generate an output voltage from the switched input voltage; and pulse width modulation (PWM) controller circuitry configured to generate a PWM signal to control the power switch circuitry; wherein the PWM controller circuitry is further configured to turn OFF the PWM signal based on a ramp signal that emulates, at least in part, current of the inductor and a feedback signal indicative of an error between the output voltage and a reference voltage.

The present disclosure also provides Pulse width modulation (PWM) controller circuitry that includes inductor current and slope compensation voltage emulation circuitry configured to receive a voltage proportional to an input voltage of a power supply and generate a ramp signal indicative of, or proportional to, inductor current of an inductor associated with a power supply and a slope compensation signal of an output of the power supply; amplifier circuitry configured to generate a feedback signal based on an error between an output voltage of the power supply and a reference signal; pulse width modulation (PWM) logic circuitry configured to generate a PWM signal, the PWM logic circuitry is also configured to compare the ramp signal and the feedback signal to determine a timing to turn the PWM signal OFF; and reset circuitry configured to reset the ramp signal to a predetermined value that is less than the feedback signal when the PWM signal is turned OFF.

The present disclosure also provides a method that includes turning a pulse width modulation (PWM) signal ON to control a switch of a power supply; generating a ramp signal, based on an input voltage to the power supply, that emulates, at least in part, inductor current of the power supply; generating a feedback signal proportional to an error between an output voltage and a reference signal; comparing the ramp signal and the feedback signal; turning the PWM signal OFF when the ramp signal is approximately equal to the feedback signal; and resetting the ramp signal to a predetermined value that is less than the feedback signal.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A power supply system, comprising:
   power switch circuitry configured to switch an input voltage of a power supply to generate a switched input voltage;
   output circuitry including an inductor to generate an output voltage of the power supply from the switched input voltage;
   pulse width modulation (PWM) controller circuitry configured to generate a PWM signal to control the power switch circuitry, wherein the PWM controller circuitry is further configured to turn OFF the PWM signal based on a ramp signal that emulates, at least in part, current of the inductor and a feedback signal indicative of an error between the output voltage and a reference voltage; and
   inductor ripple current and slope compensation voltage emulation circuitry configured to receive a signal proportional to the input voltage of the power supply and the PWM signal and generate the ramp signal that emulates the current of the inductor.

2. The power supply system of claim 1, wherein the PWM controller circuitry comprises:
    amplifier circuitry configured to generate the feedback signal based on the error between the output voltage of the power supply and the reference voltage;
    pulse width modulation (PWM) logic circuitry configured to compare the ramp signal and the feedback signal to determine a timing to turn the PWM signal OFF; and
    reset circuitry configured to reset the ramp signal to a predetermined value that is less than the feedback signal when the PWM signal is turned OFF.

3. The power supply system of claim 2, wherein the inductor ripple current and slope compensation circuitry generates the ramp signal starting at approximately a leading edge of the PWM signal and having a slope based on the signal proportional to the input voltage of the power supply.

4. The power supply of claim 1, wherein the reference signal is a signal indicative of, or proportional to, an output voltage target value.

5. The power supply of claim 1, wherein the PWM circuitry comprises:
    comparator circuitry configured to compare the ramp signal and the feedback signal and generate an output signal; and
    flip-flop circuitry configured to receive the output signal and generate the PWM signal, wherein the output signal resets the flip-flop circuitry when the ramp signal is equal to or greater than the feedback signal to turn the PWM signal OFF.

6. The power supply of claim 5, wherein the PWM circuitry further comprises:
    a first current source configured to generate a current proportional to the output voltage of the power supply; and
    a first resistor coupled to the first current source, wherein the feedback signal is represented by a voltage drop across the first resistor.

7. The power supply of claim 6, wherein the PWM circuitry further comprises:
    a second current source configured to generate a current proportional to the input voltage of the power supply;
    a second resistor controllably coupled to the second current source; and
    a reset capacitor controllably coupled to the second current source,
    wherein the ramp signal is generated when the second current source is coupled to the second resistor and the reset capacitor, as controlled by a leading edge of the PWM signal, and wherein the reset capacitor and the second resistor are decoupled from the second current source when the PWM signal is OFF.

8. The power supply of claim 7, wherein the PWM circuitry further comprises:
    pulse circuitry controllably coupled to the second resistor and the reset capacitor, wherein the pulse circuitry is configured to generate a pulse signal to reset a charge on the reset capacitor.

9. The power supply of claim 8, wherein the PWM circuitry further comprises:
    buffer circuitry configured to controllably couple the first current source to the reset capacitor based on the pulse signal.

10. Pulse width modulation (PWM) controller circuitry, comprising:
    inductor current and slope compensation voltage emulation circuitry configured to receive a voltage proportional to an input voltage of a power supply and a pulse width modulation (PWM) signal and generate a ramp signal indicative of, or proportional to, inductor current of an inductor associated with the power supply and a slope compensation signal of an output voltage of the power supply;
    amplifier circuitry configured to generate a feedback signal based on an error between the output voltage of the power supply and a reference signal;
    PWM logic circuitry configured to generate the PWM signal, the PWM logic circuitry further configured to compare the ramp signal and the feedback signal to determine a timing to turn the PWM signal OFF; and
    reset circuitry configured to reset the ramp signal to a predetermined value that is less than the feedback signal when the PWM signal is turned OFF.

11. The PWM controller circuitry of claim 10, wherein the inductor current and slope compensation circuitry generates the ramp signal starting at approximately a leading edge of the PWM signal and having a slope based on the voltage proportional to the input voltage of the power supply.

12. The PWM controller circuitry of claim 10, wherein the reference signal is a signal indicative of, or proportional to, an output voltage target value.

13. The PWM controller circuitry of claim 10, wherein the PWM circuitry comprises:
    comparator circuitry configured to compare the ramp signal and the feedback signal and generate an output signal; and
    flip-flop circuitry configured to receive the output signal and generate the PWM signal, wherein the output signal resets the flip-flop circuitry when the ramp signal is equal to or greater than the feedback signal to turn the PWM signal OFF.

14. The PWM controller circuitry of claim 13, wherein the PWM circuitry further comprises:
    a first current source configured to generate a current proportional to the output voltage of the power supply; and
    a first resistor coupled to the first current source, wherein the feedback signal is represented by a voltage drop across the first resistor.

15. The PWM controller circuitry of claim 14, wherein the PWM circuitry further comprises:
    a second current source configured to generate a current proportional to the input voltage of the power supply;
    a second resistor controllably coupled to the second current source; and
    a reset capacitor controllably coupled to the second current source,
    wherein the ramp signal is generated when the second current source is coupled to the second resistor and the reset capacitor, as controlled by a leading edge of the PWM signal, and wherein the reset capacitor and the second resistor are decoupled from the second current source when the PWM signal is OFF.

16. The PWM controller circuitry of claim 15, wherein the PWM circuitry further comprises:
    pulse circuitry controllably coupled to the second resistor and the reset capacitor, wherein the pulse circuitry is configured to generate the pulse signal to reset a charge on the reset capacitor.

17. The PWM controller circuitry of claim 16, wherein the PWM circuitry further comprises:

buffer circuitry configured to controllably couple the first current source to the reset capacitor based on the pulse signal.

18. A method, comprising:

turning a pulse width modulation (PWM) signal ON to control a switch of a power supply;

generating a ramp signal, based on the PWM signal and an input voltage to the power supply, that emulates, at least in part, inductor current of the power supply;

generating a feedback signal proportional to an error between an output voltage and a reference signal;

comparing the ramp signal and the feedback signal; and turning the PWM signal OFF when the ramp signal is approximately equal to the feedback signal.

19. The method of claim 18, further comprising:

resetting the ramp signal to a predetermined value that is less than the feedback signal.

* * * * *